United States Patent Office 2,712,555
Patented July 5, 1955

2,712,555

OXIDATION OF HALOGENATED SATURATED HYDROCARBONS

William T. Miller, Ithaca, N. Y.

No Drawing. Application December 11, 1953,
Serial No. 397,780

15 Claims. (Cl. 260—544)

This invention relates to the oxidation of halogenated saturated organic compounds. In one aspect the invention relates to the oxidation of halogenated saturated organic compounds in the presence of an activator to produce oxygen containing products. In one of its more particular aspects the invention relates to the oxidation of halogenated ethane.

Oxidation of organic compounds is not new in the art. In conventional oxidation processes actinic light or relatively high temperatures are employed to initiate the oxidation reaction which normally will not start unless activated. The use of actinic light or high temperatures is unnecessary in the presence of the activator of this invention for the oxidation of organic compounds of the type hereinafter defined.

An object of this invention is to provide a method for reacting halogen substituted saturated hydrocarbons with oxygen.

Another object is to provide an improved process for preparing halogenated organic compounds containing the —(CO)— group.

Still a further object is to provide a process for preparing halogenated acyl halides.

Still another object is to provide an improved process for preparing halogenated acetyl halides.

A further object is to provide an improved process for preparing halogenated ketones.

Yet another object is to provide a process in which the oxidation of organic compounds may be carried out in a cheaper and more facile manner than at present practiced.

Various other objects and advantages will become apparent to those skilled in the art from the accompanying description and disclosure.

In accordance with the present invention a halogen substituted saturated hydrocarbon is oxidized with free oxygen in the presence of added fluorine to produce oxygenated products. The saturated hydrocarbons which are oxygenated with free oxygen employing free fluorine as an activator are those hydrocarbons substituted only with gaseous halogen containing at least one unsubstituted hydrogen atom but no more than one unsubstituted hydrogen atom per carbon atom. The saturated hydrocarbons which are oxygenated in accordance with this invention with free fluorine as an activator contain less than 25, preferably less than 14, carbon atoms per molecule and preferably contain no more than one hydrogen atom for every three carbon atoms, particularly in long molecules.

It has been found that the elemental fluorine which is employed as an activator has the property of causing the formation of free radicals when brought into contact with the compounds of the above type. These free radicals are formed by the presence of elemental fluorine without the necessity of the use of actinic light or without the necessity of the use of as high a temperature as would be necessary with the use of other halogens as activators, such as chlorine without actinic light, for the same hydrocarbons to be oxidized. The free radicals so produced are highly reactive with oxygen. The action of fluorine in this respect is particularly valuable in providing a method for reacting halogenated hydrocarbons and oxygen of the above type to form halogenated compounds containing the —(CO)— group, such as carbonyl halides, halogen substituted acyl halides and halogenated ketones. The amount of fluorine may be as much as equimolar with respect to oxygen, but normally less than 10 mol per cent of fluorine as compared to oxygen is all that is required to activate the oxidation of the olefinic compound.

Either a terminal carbon or an internal carbon of the halogen substituted saturated hydrocarbon is oxidized in accordance with this invention in the presence of free or elemental fluorine as an activator. The hydrocarbons of more than 2 carbon atoms per molecule containing a terminal carbon to be oxidized are represented by the general formula:

in which X is chlorine or fluorine, Y is chlorine, fluorine or hydrogen and R is a monovalent hydrocarbon radical substituted only with gaseous halogen and having not more than one unsubstituted hydrogen atom per carbon atom and preferably having not more than 12 carbon atoms. Therefore, aside from the end or terminal group of the radical (R) which will contain an additional gaseous halogen, the hydrocarbon radical may be made up of any variation of the following groups:

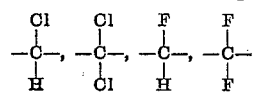

and

Preferably, the hydrocarbon radical (R) of the above formula is a perfluoro or perfluorochloro hydrocarbon radical and preferably one halogen of the carbon atom to which the hydrogen is attached and is to be oxidized is chlorine.

In the case of the hydrocarbons containing an internal carbon to be oxidized, the acyclic members of this group are represented by the formula

in which formula Y and R have the same definition set forth with regard to the hydrocarbons having a terminal carbon atom to be oxidized. Each R may be the same or different and preferably containing no more than 6 carbon atoms and completely halogen substituted. Preferably, the halogen of the carbon atom to which the hydrogen is attached in the above formula is chlorine.

The alicyclic halogen substituted saturated hydrocarbons containing an internal carbon to be oxidized are represented by the formula

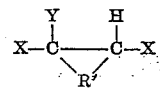

in which formula X and Y are the same as previously defined and R' is the same as R except that it is a divalent radical; that is, it does not contain a terminal or end group containing an additional gaseous halogen since the additional gaseous halogen is replaced by a bond between the radical and the carbon atom of the above formula. R' preferably contains no more than 12 carbon atoms and is also preferably a perfluoro or perfluorochloro hydrocarbon radical.

The formula for representing the ethanes which can be oxidized in accordance with this invention is

in which X and Y have been previously defined. In this case at least one X attached to the carbon atom containing the hydrogen is chlorine.

The reaction according to the invention comprises bringing together a saturated hydrocarbon of the type described, oxygen and fluorine. The quantity of fluorine required to form the free radicals is much smaller than the amount that would be normally used as a fluorinating agent. The quantity of fluorine actually used in a given reaction is preferably small for reasons of economy, although larger quantities can be used. Where the reaction is performed under conditions promoting the formation of fluorinated products, the quantity of fluorine employed should be proportionally greater. Preferably where oxidation only is desired the fluorine is about 0.01 to about 1 mol per cent on the basis of the oxygen reactant. Halogen trifluoride, such as chlorine trifluoride, may be used to supply the fluorine activation without departing from the scope of this invention.

The reaction can be performed in the liquid phase or in the vapor phase if the reactants are sufficiently volatile. A wide range of temperatures can be used although temperature has some effect on the type and distribution of products.

In the specific case of the reaction of halogen-substituted ethanes and oxygen, vapor phase reactions are satisfactorily performed at temperatures as high as 400° C. and liquid phase reactions as low as 75° C., the preferred range being between about 100° C. and about 300° C. These temperatures are not critical and the range may be extended on the upper side to a value limited by the decomposition temperature of the olefin and the dissipation of the heat of reaction and on the lower side by the freezing point of the reaction mixture. The reaction of the substituted saturated hydrocarbon and oxygen occurs readily without the use of radiant energy or elevated temperature which are the conventionally required conditions to accomplish this reaction.

To facilitate an understanding of the reaction and the part played by fluorine the following mechanism of reaction has been postulated in the specific case of reaction between pentachloroethane and oxygen, it being understood that the invention does not depend on the exact reactions indicated.

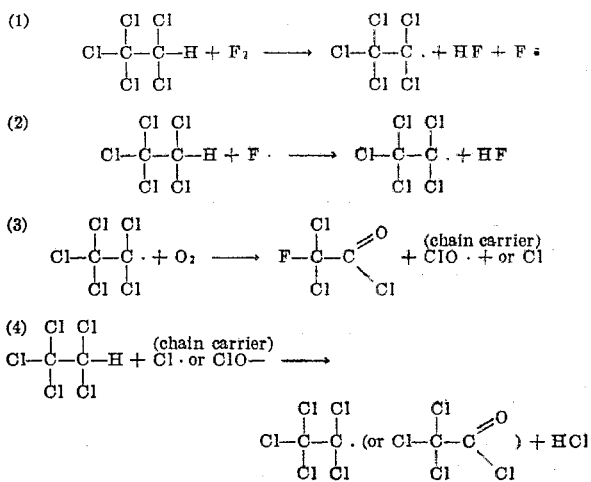

Particularly important in the above-postulated equations is the propagation of the reaction by a chain mechanism. Molecular fluorine reacts to form two free radicals, $CCl_3CCl_2 \cdot$ and $F \cdot$. The fluorine radical reacts largely with another molecule of the pentachloroethane to form a further $CCl_3CCl_2 \cdot$ radical. The $CCl_3CCl_2 \cdot$ radical reacts with molecular oxygen to form an acid chloride and a chain carrier as $ClO \cdot$ or $Cl \cdot$, etc., which reinitiates the oxidation cycle. The chain mechanism results in a rapid, high-yield reaction.

In view of this type of reaction mechanism, the most favorable conditions for this process are determined primarily by the nature of the reactant materials. Since fluorine is a very highly reactive substance it is preferred to employ only such amounts as are required to initiate and maintain the chain reaction at a desired rate. Oxygen, on the other hand, is preferably employed in amounts in substantial excess over that required for the reaction. Under certain conditions, for example, when it is desirable to employ a relatively high proportion of fluorine in the gas mixture or to operate at relatively high temperatures where the reactivity of fluorine is exceptionally high, it may be desirable to dilute the fluorine-oxygen mixture with an inert component, such as nitrogen, in order to obtain a more controllable reaction. Alternatively, carefully dried air or even certain waste gases containing oxygen and/or fluorine may be economically employed in this process. Furthermore, due to the fact that fluorine is so highly reactive and the reaction between fluorine and carbon compounds is highly exothermic, in order to obtain the described results and maintain a desired rate of reaction it is necessary to provide adequate means for dissipating the heat of reaction.

The following examples are directed to provide evidence of the utility of the described process and to give an indication of the variety of conditions under which it may be carried out. However, it will be understood that while these examples embody the essential features of the process, the process of this invention is not necessarily limited thereto.

EXAMPLE 1

One mole, 202.3 g., of pentachloroethane, $CHCl_2CCl_3$, was placed in a three-necked glass flask which was fitted with a mechanical stirrer, a thermocouple contained in a glass jacket, and gas inlet and outlet tubes. The inlet tube was of copper and extended down into the flask to near the liquid level. Its open end was wrapped with copper wire gauze in order to avoid possible local overheating. An oil bath provided with an electrical heater for temperature control surrounded the reaction flask.

Reaction was carried out by passing in an oxygen-fluorine mixture in the ratio of 49:1 with stirring and with the temperature maintained between 97° C. and 105° C. A uniform gas flow was maintained such that during 5 hours and 49 minutes 0.882 mole of oxygen and 0.018 mole of fluorine were utilized. Reaction occurred smoothly and the product was a clear water white liquid. During the course of the reaction phosgene was slowly distilled from the reaction flask and recovered by condensation in a Dry-Ice cooled trap. The following products shown in Table I were recovered by distillation:

Table I

| | Mole |
|---|---|
| Unreacted pentachloroethane, $CHCl_2CCl_3$ | 0.812 |
| Phosgene, $COCl_2$ | 0.01 |
| Trichloroacetylchloride, $CCl_3COCl$ | 0.099 |

Portions of phosgene and trichloroacetyl chloride were reacted with aniline to form sym.-diphenyl urea, M. P. 238° C., and trichloroacetanilide, M. P. 94° C. The above experiment shows cleavage to phosgene—(carbon-carbon bond cleavage involving carbon to which H is attached)—as well as oxidation of the terminal group, —CHClX, to $$\overset{O}{\underset{}{\overset{\|}{C}}}-Cl$$

an acid halide.

EXAMPLE 2

Tetrachloroethane, 459.6 g., was treated with a fluorine-oxygen mixture at 70° C. for 9½ hours. The fluorine was generated in a nickel cell by electrolysis of fused potassium bifluoride with a current of 4 amperes. Approximately two volumes of oxygen per volume of fluorine were added. Phosgene was evolved during reaction. The weight of the liquid product poured from the reaction vessel was 427.2 g. Dichloroacetyl chloride, $CHCl_2COCl$, B. P. 107.2–108° C. was isolated by distillation of the liquid product. Oxalyl chloride, $(COCl)_2$, was also formed.

By reaction with aniline, dichloro acetanilide, M. P. 116.5–118° C., was obtained from the product of the above reaction.

The invention is not limited to the two-carbon compounds disclosed in the examples but is broadly applicable to halogen substituted olefins having up to 24 carbon atoms per molecule.

Reactions with other hydrocarbons of the type defined are carried out in the same manner as illustrated in the examples with the halogen substituted ethanes. The oxidation of such other compounds are shown below where the general reaction is shown first for a general class of compounds and specific reactions then follow. In Formulas 5, 12 and 16 below, X is chlorine or fluorine, Y is chlorine, fluorine or hydrogen and R is a monovalent hydrocarbon radical and R' is a divalent hydrocarbon radical, as previously defined.

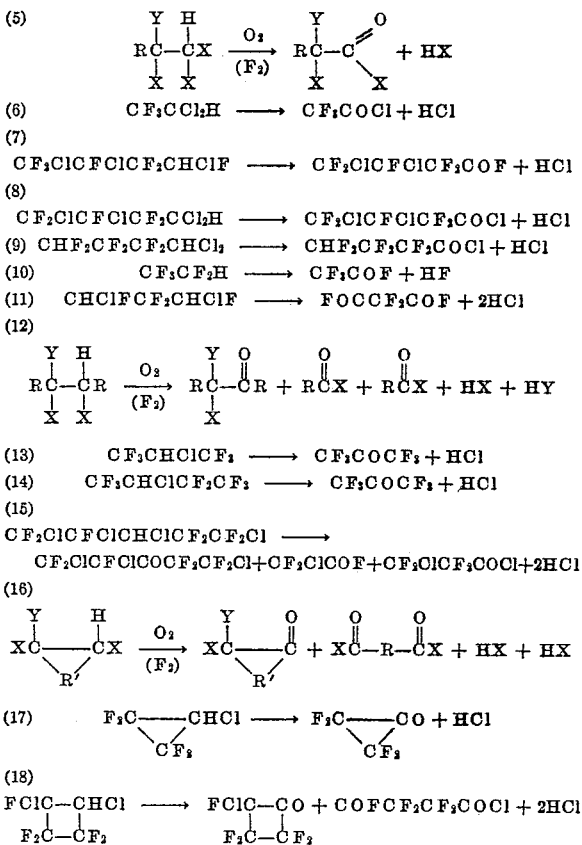

The halogenated hydrocarbons starting compounds to be oxidized can be prepared by various methods. One method is the production of the corresponding chlorinated compound by conventional methods and the substitution of the desired amount of fluorine for chlorine.

The invention provides a valuable process for preparing a series of organic compounds. The commercial methods for reacting halogen substituted saturated hydrocarbons and oxygen or chlorine have heretofore required difficult operating conditions and complicated equipment. The conventional reaction conditions rely on activation of the reactants by high temperatures and/or light. The use of light has been attended with great operating difficulties because of the limited zone of activity around the light source, coating of the light source with reaction products, difficulty of operating with colored mixtures, etc. The high temperature reactions are unsuitable for many compounds because of excessive decomposition. The fluorine-promoted reactions of this invention are rapid, permit great flexibility in operating temperatures and other conditions, and require only simple types of equipment. Control of the promoter concentration by gas feed is simple and effective and homogeneous reactions may be obtained.

Since many embodiments might be made of the present invention and since many changes might be made in the embodiment described, it is to be understood that the foregoing description is to be interpreted as illustrative only and not in a limiting sense.

Having described my invention, I claim:

1. The process for preparing a halogenated organic compound containing the —(CO)— group which comprises reacting ethane substituted only with gaseous halogen and containing at least one and not more than two hydrogen atoms; and oxygen in the presence of elemental fluorine; and separating a halogenated organic compound containing the —(CO)— group from the reaction mixture.

2. The process for preparing a halogenated organic compound containing the —(CO)— group which comprises reacting pentachloroethane and oxygen in the presence of elemental fluorine, and separating a halogenated organic compound containing the —(CO)— group from the reaction mixture.

3. The process for preparing a halogenated organic compound containing the —(CO)— group which comprises reacting tetrachloroethane and oxygen in the presence of elemental fluorine, and separating a halogenated organic compound containing the —(CO)— group from the reaction mixture.

4. The process for preparing a halogenated organic compound containing the —(CO)— group which comprises reacting trifluorodichloroethane and oxygen in the presence of elemental fluorine, and separating a halogenated organic compound containing the —(CO)— group from the reaction mixture.

5. The process for preparing a halogenated organic compound containing the —(CO)— group which comprises reacting hexafluorotrichlorobutane and oxygen in the presence of elemental fluorine, and separating a halogenated organic compound containing the —(CO)— group from the reaction mixture.

6. A process for oxidation of halogenated organic compound which comprises reacting a saturated halogenated hydrocarbon having less than 25 carbon atoms substituted only with gaseous halogen containing at least one hydrogen atom but no more than one hydrogen atom per carbon atom with oxygen in the presence of fluorine to produce an oxygenated product containing the —(CO)— group.

7. The process of claim 6 in which said halogenated hydrocarbon contains a hydrogen atom attached to a terminal carbon atom.

8. The process of claim 6 in which said halogenated hydrocarbon contains no more than 4 hydrogen atoms.

9. The process of claim 6 in which said halogenated hydrocarbon contains no more than 14 carbon atoms.

10. The process of claim 6 in which said halogenated hydrocarbon contains a hydrogen atom attached to an internal carbon atom.

11. The process of claim 10 in which said halogenated hydrocarbon is acyclic.

12. The process of claim 10 in which said halogenated hydrocarbon is alicyclic.

13. The process of claim 6 wherein the reaction is performed in the vapor phase.

14. The process of claim 6 wherein the reaction is performed with the halogenated hydrocarbon in the liquid phase.

15. The process of claim 6 wherein the reaction is performed in the presence of an inert diluent gas.

No references cited.